Patented Aug. 5, 1930

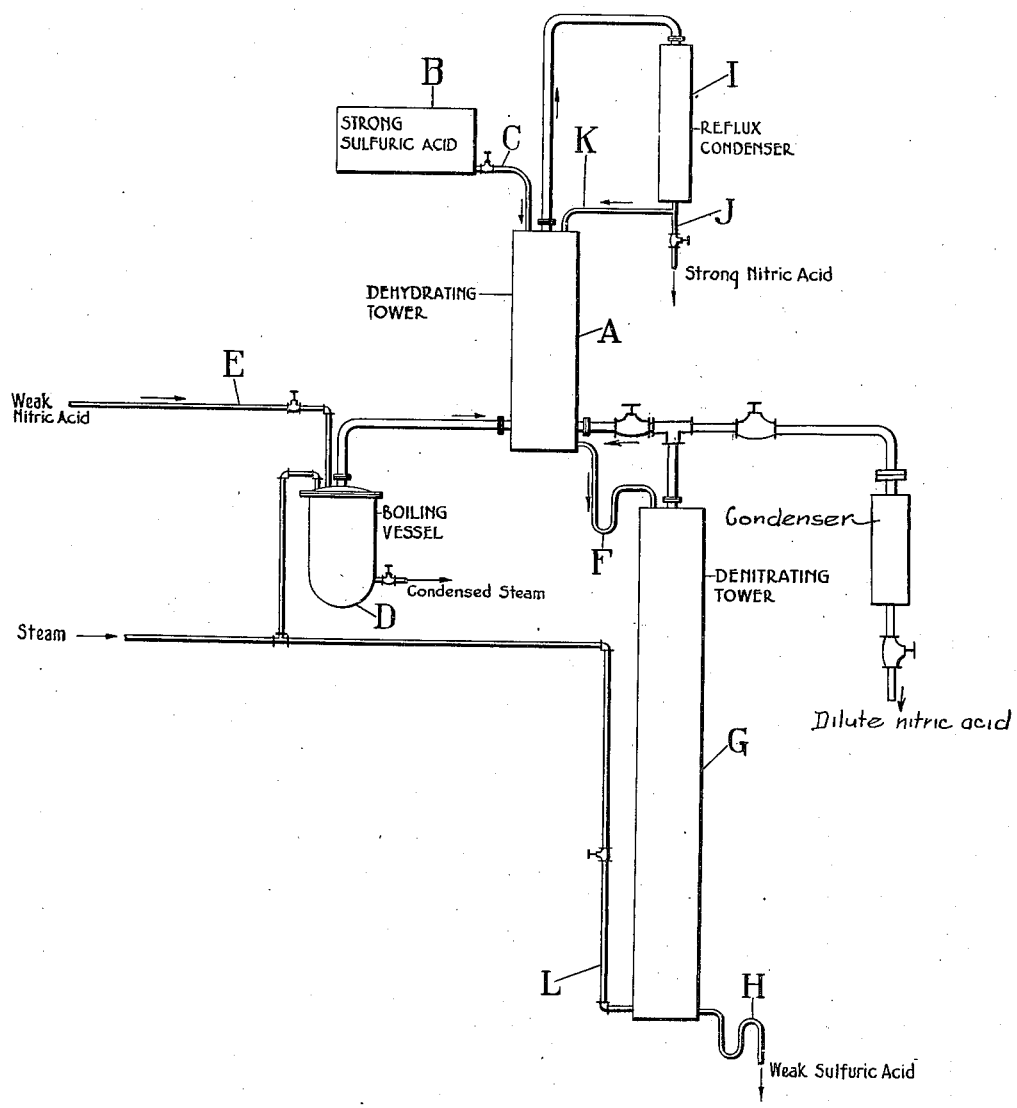

1,772,122

UNITED STATES PATENT OFFICE

FRED C. ZEISBERG, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE HIGH CONCENTRATION OF NITRIC ACID

Application filed June 27, 1927. Serial No. 201,609.

This invention relates to the concentration of nitric acid to a high strength by means of a dehydrating agent and heat, with a minimum use of such dehydrating agent.

It is well known that nitric acid of an intermediate strength, say from 50% to 70% $HNO_3$, is most economically concentrated to a high strength by mixing with it a dehydrating agent to bind or hold back the water and then applying heat to the mixture to distil out the nitric acid. Many such dehydrating agents have been proposed, but the one which has found the most favor industrially is, overwhelmingly, concentrated sulfuric acid.

In the oldest and best-known process using sulfuric acid, the mixture of dilute nitric acid and concentrated sulfuric acid is put in a retort and heat is applied. The nitric acid distils out, the first portion coming over strong, but as the distillation proceeds the distillate becomes increasingly weaker until the last portions are no stronger than the dilute nitric acid originally used. These last runnings are generally set aside and used in the mixture for the following run. This cut-off generally amounts to about 20% of the $HNO_3$ originally in the mixture.

The necessity for taking this cut-off and the necessity of starting with a mixture such that the residual sulfuric acid is not so weak as to cause excessive action on the cast iron retorts customarily used in the process, require that a comparatively large amount of sulfuric acid be used in the process. Assuming that 60% nitric acid is to be concentrated by means of 92% sulfuric acid used in such proportions that the residual acid from the retort contains not less than 80% $H_2SO_4$, from 3.75 to 4.00 pounds of $H_2SO_4$ must be used for every pound of $HNO_3$ concentrated. This sulfuric acid, in a self-contained process, must be concentrated to its original strength for reuse, and this concentration constitutes the principal item of expense in the whole process. Moreover, the usual objections to a batch process, as opposed to one operating continuously, obtain as well.

To overcome intermittent operation and avoid the repair costs incident to the action of the acid on the cast iron of the retorts used in the distillation, a continuous process was proposed by Pauling, U. S. Patent 1,031,864. In this process dilute nitric acid and strong sulfuric acid are run down a packed tower in admixture, or separately but concurrently (as opposed to countercurrently), while steam is blown into the bottom of the tower and, ascending countercurrent to the liquid acid mixture, condenses into it and distils out the nitric acid which leaves the top of the tower as vapors of highly concentrated nitric acid. Various modifications have been proposed by the same inventor, but in every case the heating medium is steam which condenses into the acid mixture.

Steam, when used in this way, while it is a convenient source of heat, possesses the decided disadvantage that the water resulting from its condensation dilutes the sulfuric acid used in the process, and must be boiled out of the sulfuric acid before this acid can be used again. Again assuming 60% nitric acid concentrated by means of 92% sulfuric acid, for every pound of $HNO_3$ concentrated 0.614 pound of water which originally accompanied the $HNO_3$ must be boiled out of the sulfuric acid, while from 0.75 to 0.90 pound of water resulting from the condensation of the steam must be boiled out. The condensed steam therefore exceeds the original diluting water. Moreover, largely because of this added water, it is necessary to concentrate a minimum of 4.0 pounds $H_2SO_4$ for every pound of $HNO_3$ concentrated.

As opposed to this extensive concentration of sulfuric acid in the prior art, I have found that by my novel process it is necessary to concentrate only about 2.75 pounds $H_2SO_4$ per pound $HNO_3$, when starting with 60% nitric acid and 92% sulfuric acid, and that in addition to the water originally present in the nitric acid, it is necessary to boil out of this sulfuric acid only about 0.08 pound water resulting from the condensation of steam, a saving over the Pauling process of 1.25 pounds $H_2SO_4$ and 0.07 to 0.82 pound water for every pound $HNO_3$ concentrated.

My process consists in passing vapors of dilute nitric acid into the bottom of a packed dehydrating tower, or similar apparatus, while passing through this apparatus a countercurrent of strong sulfuric acid or other suitable liquid dehydrating agent. The vapors of strong nitric acid emerging from the top of the tower are condensed in a reflux condenser and a portion of the strong condensate is returned to the top of the tower and reintroduced into it concurrently with the strong sulfuric acid so that by its revaporization it may abstract heat from the top of the tower. The remaining fraction of the condensate is drawn out of the process and run to storage. The hot liquid acid mixture running out of the bottom of the dehydrating tower is run into a denitrating tower, descriptions of which abound in the prior art, and steam is introduced into the bottom of this tower in only enough amount substantially to denitrate the mixture which emerges from the bottom of the dehydrating tower, the nitric acid escaping from the top of the denitrating tower as vapors having substantially the same composition as the vapors originally introduced into the bottom of the dehydrating tower. These vapors from the denitration are joined to those entering the dehydrating tower. Any oxides of nitrogen which may be formed in the process pass through the reflux condenser uncondensed and may be converted to weak nitric acid in absorption towers customarily used for this purpose.

The drawing shows a diagrammatic side elevation of one assembly of apparatus suitable for carrying out my process. A is the dehydrating tower, constructed of acid-proof material and packed with some suitable packing, such as quartz. B is a storage tank for concentrated sulfuric acid. By means of a connecting line carrying a valve C this acid is continuously and uniformly introduced into A. Into the bottom of A is introduced a stream of nitric acid vapor generated in the boiling pot D, which may consist of a chrome iron pot containing a steam coil, though direct fire or any other controllable source of heat may equally well be used. The weak nitric acid to be concentrated is introduced into the boiling pot D through the valved line E. Its rate of addition and the rate of heating are so controlled that with a constant supply of strong sulfuric acid from B, the denitrated acid emerging from the trap H has a strength of about 73% $H_2SO_4$. The vapors of highly concentrated nitric acid leaving A pass through a line to the reflux condenser I and are there condensed to a liquid which runs out through valved line J. This valve is partly closed so that the condensate backs up, and part of it flows back through the line K to the top of the dehydrating tower A. The part passing through line J goes to the strong nitric acid storage (not shown). The amount refluxed varies with its temperature and the temperature of the sulfuric acid. If their average temperature is about 20° C. about 1.5 to 1.75 pounds are returned for every pound taken out of the system.

The hot sulfuric acid leaving A contains practically all of the water of the nitric acid vapors from D, and a few percent of nitric acid and is in equilibrium with the vapors entering the bottom of the dehydrating tower. It enters the denitrating tower G through the trap F. G is the usual packed acid-proof tower of the denitrating art and in it the acid mixture is denitrated by means of steam controllably introduced through line L. The substantially completely denitrated sulfuric acid is run out at H and goes to the sulfuric acid concentration plant, whence it is returned to B for reuse. Only a very small amount of steam need be introduced through line L, usually from 5 to 10% of the weight of nitric acid concentrated, the rate of its introduction being governed by the strength of the vapors leaving tower G. These are maintained at a strength but little, if any, below the strength of the vapors from pot D; if they are much lower less steam is introduced through line L. The nitric acid vapors leaving G are introduced into the bottom of A.

Instead of refluxing the nitric acid condensate the same result can be achieved by precooling the dehydrating agent before introducing it into the dehydrating tower, but practically it is easier to reflux the nitric acid. If the reflux is cut down, or the dehydrating agent is warmed I have found that the quantity of dehydrating agent necessary to accomplish a certain amount of concentration is increased, while if the reflux is too greatly increased or too great a cooling effect is produced at the top of the dehydrating tower the acid mixture leaving this tower will be difficult to denitrate. In general, I prefer to use such an amount of reflux that the acid mixture entering the denitrating tower contains not more than 2 or 3% $HNO_3$, and if such is the case the amount of $H_2SO_4$ required per pound of $HNO_3$ concentrated will not exceed 3 pounds when starting with 60% nitric acid and 92% sulfuric acid.

It might be thought that the process described by Pauling in U. S. Patent 993,868 is analogous to my invention, but that Pauling did not understand the principles of my invention is shown by his direction to preheat the sulfuric acid introduced to his dehydrating columns, whereas I prefer to cool the sulfuric acid in my process.

I have described one modification of my process, but it is obvious to one skilled in the art that there are other ways in which it might be carried out. Thus, it is not necessary to use towers, any form of countercurrent apparatus being suitable; or, various methods of vaporizing the nitric acid might be used. Or, if a use for very dilute nitric acid existed, the vapors from the denitrating tower could be sent to a separate condenser instead of to the foot of the dehydrating tower, in which case the amount of sulfuric acid used to concentrate a pound of $HNO_3$ might be reduced to 2 pounds or less. If desired, the two towers might be combined in one. All or any of these modifications might be carried out without departing from the spirit of my invention.

I claim:

1. A process of producing highly concentrated nitric acid which comprises introducing vapors of dilute nitric acid at one end of an unheated counter-current of liquid dehydrating agent, and abstracting heat from the extreme opposite end of the countercurrent system.

2. A process of producing highly concentrated nitric acid which comprises introducing vapors of dilute nitric acid into a countercurrent apparatus at one end of a countercurrent of liquid dehydrating agent, abstracting heat from the extreme opposite end of said counter-current apparatus by any suitable means, subjecting the escaping hot nitric-acid containing dehydrating agent to just sufficient steam to completely denitrate it, and passing the resulting nitric acid vapors into the first mentioned countercurrent apparatus along with the original vapors of dilute nitric acid.

3. A process of producing highly concentrated nitric acid which comprises introducing vapors of dilute nitric acid into one end of a dehydrating tower, introducing an unheated countercurrent of concentrated sulphuric acid into the extreme opposite end of said tower, refluxing and returning to said extreme opposite end of the tower a substantial portion of the concentrated nitric acid evolved, and withdrawing hot dilute nitric acid-containing sulphuric acid from the end of said dehydrating tower at which the original nitric acid vapors are introduced.

4. The process of claim 3 wherein the escaping hot nitric acid-containing sulfuric acid is subjected to just sufficient steam to completely denitrate it, and the resulting nitric vapors are passed into the tower with the original vapors of dilute nitric acid.

5. A process of producing highly concentrated nitric acid by introducing vapors of about 60% nitric acid at one end of a countercurrent of about 92% sulfuric acid in a dehydrating tower; refluxing at the extreme opposite end of said countercurrent a proportion of the nitric acid vapors evolved equivalent on the basis of a temperature of 20° C. for incoming sulfuric acid, to about 1.5 to 1.75 pounds per pound nitric acid removed from the system to abstract heat from said nitric acid vapors, thereby condensing and returning the water contained therein to the countercurrent system; subjecting the escaping hot sulfuric acid to denitration with steam to produce approximately 60% nitric acid vapor; passing the resulting nitric acid vapors into said dehydrating tower; the introduction of the 60% nitric acid vapors and the conditions of operation being so controlled that the denitrated sulfuric acid will have a strength of about 73% $H_2SO_4$.

In testimony whereof I affix my signature.

FRED C. ZEISBERG.